Jan. 16, 1940.　　　I. KITROSER　　　2,187,128

PHOTOGRAPHIC CAMERA

Filed April 21, 1937　　　6 Sheets-Sheet 1

Inventor:
Isaac Kitroser,
Bailey & Carson
Attorneys

Jan. 16, 1940.  I. KITROSER  2,187,128
PHOTOGRAPHIC CAMERA
Filed April 21, 1937  6 Sheets—Sheet 2

Inventor:
Isaac Kitroser,
Bailey & Carson
Attorneys

Jan. 16, 1940.　　　　I. KITROSER　　　　2,187,128
PHOTOGRAPHIC CAMERA
Filed April 21, 1937　　　　6 Sheets-Sheet 3
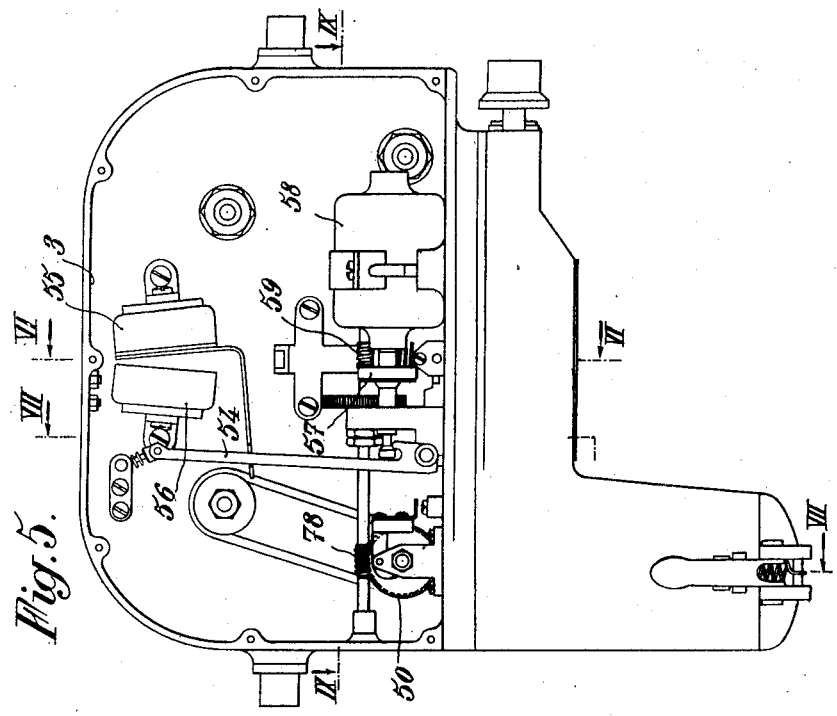
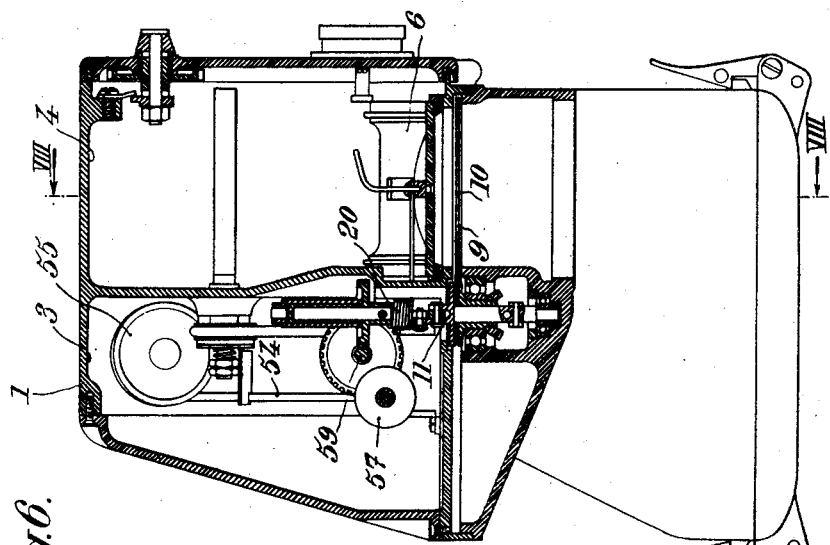
Inventor:
Isaac Kitroser,
Attorneys

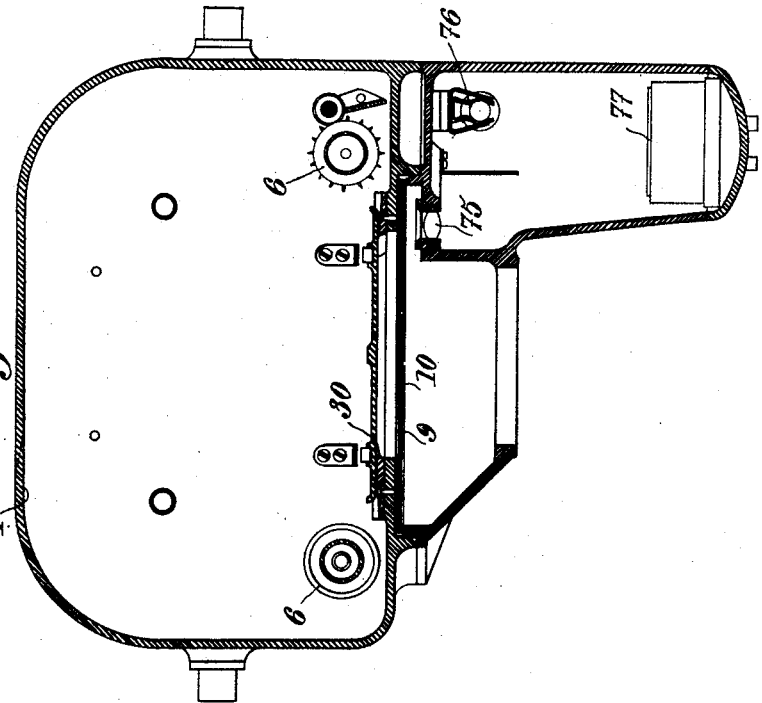
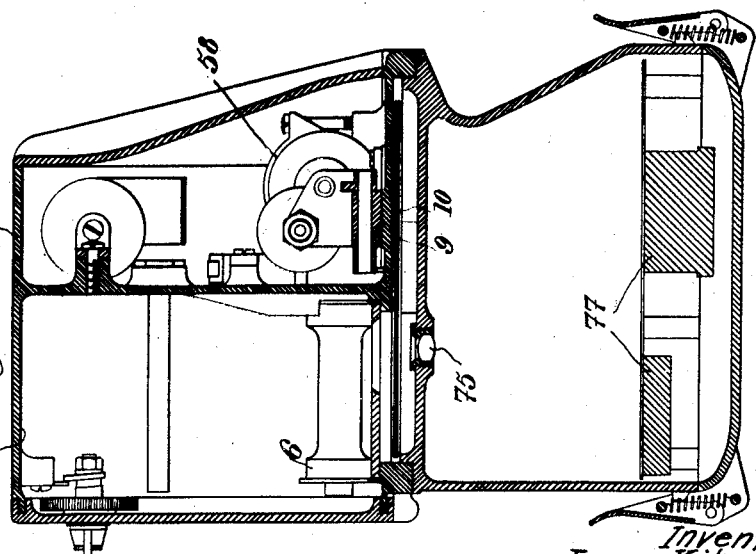

Jan. 16, 1940.　　　　I. KITROSER　　　　2,187,128
PHOTOGRAPHIC CAMERA
Filed April 21, 1937　　　6 Sheets-Sheet 5

Inventor:
Isaac Kitroser,
Attorneys

Jan. 16, 1940.  I. KITROSER  2,187,128
PHOTOGRAPHIC CAMERA
Filed April 21, 1937  6 Sheets-Sheet 6
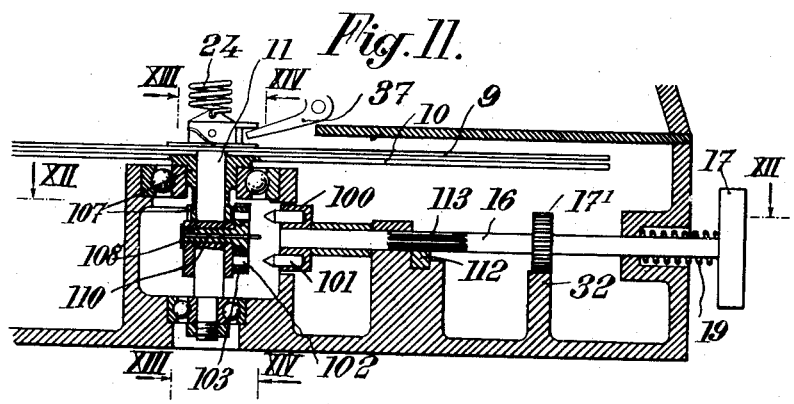
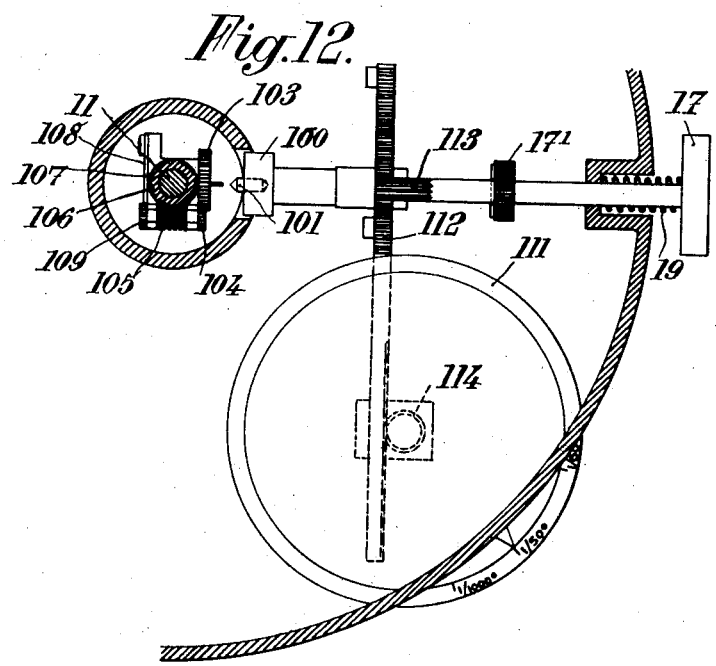
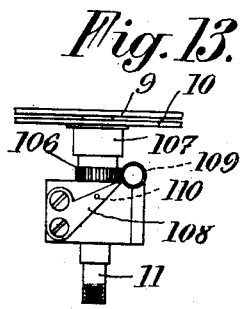
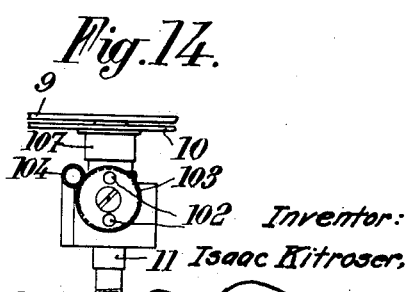
Inventor:
Isaac Kitroser
Bailey & Carson
Attorneys Patented Jan. 16, 1940

2,187,128

UNITED STATES PATENT OFFICE 2,187,128

PHOTOGRAPHIC CAMERA

Isaac Kitroser, Viroflay, France, assignor to Société Bronzavia, Courbevoie (Seine), France, a society of France Application April 21, 1937, Serial No. 138,254
In Belgium April 25, 1936

11 Claims. (Cl. 95—61)

The present invention relates to photographic cameras provided with focal plane shutters, the term "focal plane shutter" designating all shutters the movable parts of which, intended to control the flow of the light rays to the sensitized surface (plate or film) move very close to this surface. The invention is more especially, although not exclusively, concerned with apparatus of this kind for taking aerial photographs.

The object of the present invention is to provide an apparatus of this kind which is better adapted to meet the requirements of practice.

According to the essential feature of the present invention, the shutter of the photographic camera consists of a screen capable of being rotated in its own plane, close to the sensitized surface, and provided with at least one slot, preferably of adjustable aperture, the whole being operable through means such that, under the control of a suitable release, said screen is given a temporary rotating movement which permits the luminous beam to sweep the whole of the sensitized surface through said slot.

According to another feature of the present invention, the apparatus of the kind above described are arranged in such manner that the locking mechanism of their lid ensures, when the latter is closed, the opening of the magazines containing the sensitized surfaces (plates or film), and that, inversely, said locking mechanism ensures the shutting of said magazines when said lid is opened, in such manner that said sensitized surface is always protected against the action of light when the apparatus is being loaded or unloaded.

A third feature according to the present invention consists in establishing between the shutter setting mechanism of the apparatus of the type above referred to and the release mechanism of said shutter, connections or other means devised in such manner that, when the setting has been performed, the setting mechanism is locked and remains so as long as the shutter has not been released.

Still another feature of the present invention, which is to be used preferably in combination with that just above mentioned when the displacement of the sensitized surface is effected by operating the setting mechanism, consists in the provision of means such that, on the one hand, as long as said surface has not been moved, after taking a picture, it is impossible to produce another opening of the shutter and that, on the other hand, as soon as said surface has been correctly displaced, it is impossible to further displace it as long as the shutter has not been operated.

Other features of the present invention will result from the following detailed description of some specific embodiments thereof.

Preferred embodiments of the present invention will be hereinafter described, with reference to the accompanying drawings, given merely by way of example, and in which:

Fig. 3 is a horizontal sectional view, on the line III—III of Fig. 2;

Fig. 4 is a vertical longitudinal sectional view on the line IV—IV of Fig. 3;

Fig. 5 is an elevational view, with some parts cut away, of an automatic photographic apparatus made according to the invention;

Fig. 6 is a sectional view on the line VI—VI of Fig. 5;

Fig. 7 is a vertical sectional view on the line VII—VII of Fig. 5;

Fig. 8 is a sectional view on the line VIII—VIII of Fig. 6;

Fig. 11 is an axial sectional view of a device for adjusting the time of exposure made according to another embodiment of the invention;

Fig. 12 is a partial sectional view on the line XII—XII of Fig. 11;

Fig. 13 is a partial sectional view on the line XIII—XIII of Fig. 11;

Fig. 14 is a partial sectional view on the line XIV—XIV of Fig. 11.

Figure 1:
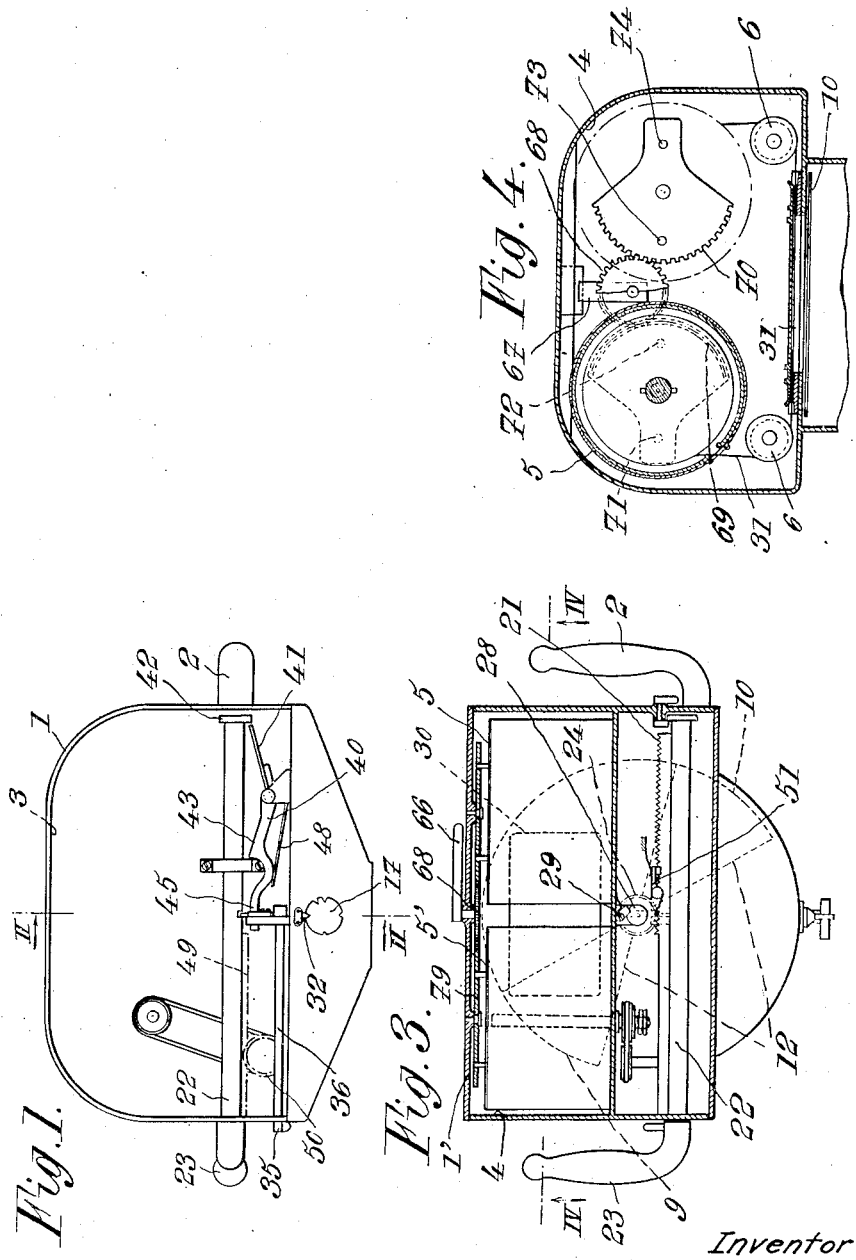
Fig. 1 is an elevational view, with some parts cut away, of a photographic apparatus made according to the present invention.

All these drawings relate more especially to a focal plane shutter photographic apparatus, for instance for aerial photography.

In order to constitute the focal plane shutter of this apparatus, I make use of a screen capable of being rotated, substantially in its own plane, close to the sensitized surface (said surface being constituted for instance, as it will be assumed in the following description, by a film), said screen being provided with at least one slot. The whole is adapted to be operated by means such that, under the effect of a suitable release, said screen can be given a temporary rotary movement which permits a light beam to sweep the whole of the area of said surface through the above mentioned slot.

For this purpose, considering first the whole of the apparatus, with the exception of said rotary shutter screen, and of the means for driving it, said apparatus is made in any conventional manner, and includes, for instance, the following parts:

a. A casing 1, which is provided with a fixed handle 2 and in which there is provided a chamber 3 adapted to contain the driving means above referred to, and a camera obscura 4, closed by a lid 1', in which camera are disposed the magazines 5 and 5', intended respectively to contain the film before and after exposure, and parts such as two drums 6, capable of stretching and driving said film, as it will be more explicitly described in what follows; and b. An optical system consisting advantageously of one or several lenses 7, having different focal lengths, mounted on a revolving support 8 in a known manner so as to permit of bringing at will any of said lenses opposite the sensitized surface to be exposed.

Concerning now the rotary screen shutter system above referred to, it may be given various embodiments, and especially it may be devised in such manner as to permit variation of the time of exposure, when it is desired.

For instance, the screen in question might consist of a mere disc, provided with a fixed slot, having its edges preferably arranged radially, in which case, in order to vary the time of exposure, the rotary speed of said screen would be varied.

But the invention permits, which is particularly advantageous, of obtaining variations of the time of exposure by an adjustment of said slot in which case it is possible (although it is not necessary) to keep the rate of movement of said screen constant.

Therefore, supposing that this last mentioned arrangement has been adopted, the screen consists preferably of two blades 9 and 10, for instance in the form of sectors, mounted in variable relative positions on a spindle 11 provided on the outside of the rectangular aperture 30 against which film 31 is moving, preferably along one of the median lines of said aperture, said blades therefore limiting through their adjacent edges a sector-shaped aperture slot 13.

Means are provided for imparting a rotary movement to the whole of these two blades, while permitting the adjustment of their initial relative positions.

For instance, one of said blades, say 9, is fixed rigidly to said spindle 11, which can be given a revolving movement about its axis from a driving and release system, for instance of the kind that will be hereinafter described.

The other blade 10 is mounted coaxially with the first one, on a movable support such as a pinion 13, which will be hereinafter referred to, adapted to be coupled with spindle 11 through means such as a comb-like part 14, pivoted by pin 11a on said spindle and normally kept by a spring 15 in a position such that it meshes with said pinion.

Finally, in order to permit an adjustment by rotating the two blades relatively to each other, I make use advantageously of means permitting, through a single movement, of uncoupling blades 9 and 10, and of imparting the necessary relative rotary movement to said blade 10.

These last mentioned means consist for instance of an operating rod 16 (Fig. 2) provided, at one end, with an operating knob 17, provided with graduations corresponding to times of exposure, and, at the other end, with a bevel pinion 18 capable, when rod 16 is pushed against the action of a spring 19, on the one hand of coming into mesh with pinion 13, and on the other hand of producing the disengagement of comb-like member 14 through engagement of projection 16a of rod 16 with a lug portion of member 14.

The whole is preferably devised in such manner that knob 17 can be turned only when it is so pushed against the action of spring 19. To this effect, for instance, knob 17 can be provided with notches coacting with a pointer 32 in such manner that the latter is disengaged from said notches only when said rod is so pushed.

It will be readily understood that it is thus possible, by turning knob 17, after having pushed it against the action of spring 19, to modify the relative position of blade 10 with respect to blade 9 and therefore the aperture of slot 12, which permits of adjusting in an accurate manner the time of exposure without having to modify the rate of movement of blades 9 and 10. When rod 16 comes back to its initial position, the two blades are again made rigid with each other.

In Figs. 11 to 14, I have shown another embodiment of means for adjusting the time of exposure.

According to this embodiment, rod 16, which is still operated by a knob 17, is provided, at its free end, with a plate 100 with pins 101, said pins being adapted to engage, when the rod is pushed, into the holes 102 of a driving device for the shutter 10.

This device includes, for instance, a toothed wheel 103, the axis of which is carried by pivot 11, which wheel 103 drives, through a pinion 104, an endless screw 105 in mesh with a pinion 106 rigid with a sleeve 107 on which the shutter 10 is mounted.

In order to ensure that pins 101 and holes 102 are always in correct relative positions for their engagement, I further provided, on the one hand a first interlocking capable of stopping rod 16 in its disengaged position and constituted for instance by a pinion 17¹ and teeth 32, and, on the other hand, a second interlocking constituted by an elastic pawl 108 coacting with a pinion 109 rigid with screw 105, said interlocking means being interposed between sleeve 107 and sleeve 11.

This pawl 108 normally locks the whole of the two shutter elements, and it is released only when rod 16 is pushed, the latter then acting upon a small bar 110 which moves away said pawl.

With the rod 16, I may combine a time of exposure indicating device 111, operated by a rack 112 and pinions 113—114.

Concerning now the system for simultaneously driving the blades, through spindle 11, it is devised for instance in such manner that the energy necessary for producing the rotary movement of said spindle is supplied by elastic means which are preferably brought into a set position, said elastic means being adapted to be released by a release mechanism such that it permits of turning spindle 11 through a full revolution and therefore of obtaining a full revolution of the blades, whereby slot 12 can pass in front of the sensitized surface.

The elastic means are preferably constituted by a cylindrical spiral spring 20, arranged coaxially with spindle 11 and which is caused to work by a twisting deformation thereof. This spring has one of its ends connected to the pivot in question, that is to say 11, either directly or indirectly. The other end of said spring is connected to a setting device. This setting device includes, for instance, a rack 21 carried by a rod 22 operable through a handle 23. This rack is in mesh with a pinion 24 capable of driving, in a single direction owing to the provision of a ratchet or equivalent mechanism 25—26, a spindle 27, mounted coaxially with spindle 11 and to which is fixed the second end of said spring 20. Furthermore, a pawl locking mechanism 28—29 is provided on spindle 27 in such manner as to immobilize the latter after the setting has been performed and when rod 22, together with its rack, is brought back to its initial position.

As for the release mechanism, it is made in the following manner:

First of all, it essentially includes a pawl or equivalent device 33 which, keeping the blades, or spindle 11, in an initial position against the action of spring 20, can release it temporarily at the time of the release, which is obtained through a suitable control device, such as that which will be hereinafter described.

Furthermore, according to another arrangement of the invention, said release mechanism may be arranged and combined in such manner with the shutter setting mechanism and with the means for displacing the film that the following conditions are complied with:

a. On the one hand, as long as the film has not been moved after taking a picture, it is impossible to produce a new opening of the shutter;

b. On the other hand, as soon as the film has been moved forward the correct distance, it cannot be further moved as long as the release of the shutter has not been performed.

This arrangement will be applied in a particularly advantageous manner in the case in which the displacement of the film is effected through the operation of the setting mechanism of the shutter, for instance, in the embodiment shown by the drawings, as a result of the operation of rod 22, which serves to actuate the film driving drum or drums 6. either during the forward stroke of said rod, or, preferably and as supposed by the drawing, during its return stroke, and this through suitable kinematic means (for instance by means of a second rack 49 driving drum 6 through a pinion 50, by means of a ratchet wheel device).

It then suffices, in order to obtain the arrangement above stated, to combine rod 22 with the shutter release mechanism in such manner that the following conditions are complied with:

a. On the one hand, this release mechanism can be operated only for the position of rod 22 corresponding to the end of its return stroke (this position being that shown by the drawing);

b. On the other hand, said rod is locked in this position as long as the shutter has not been released.

A device capable of complying with these conditions is for instance the following one, illustrated by the drawings:

In this embodiment, the stop pawl 33 carried by and oscillatably journalled on spindle 11 by pin 34 is subjected to the action of a spring 33c in such manner that, after the release, its finger 33a comes to stop in the groove of a fixed abutment 33b, as soon as the spindle and the blades have turned through a full revolution.

The release of said pawl is effected by means of a release member 35, pivoted about a spindle 36 and carrying a first lever 37 which comes, at the time of said release, under finger 33a to lift pawl 33, in such manner as to disengage it temporarily from the groove of abutment 33b.

However this operation is possible only when rod 22 is pushed as shown by Fig. 1, this being due to the fact that, in the system as illustrated by the drawing, a second lever 38 is carried by the release member 35, rigid therewith. This second lever 38 is arranged in such manner that, at the time of the release, its end must engage in a groove 39 provided in said rod, the whole being such that said groove is located opposite lever 38 only when rod 22 is in the position above referred to.

Figure 2:
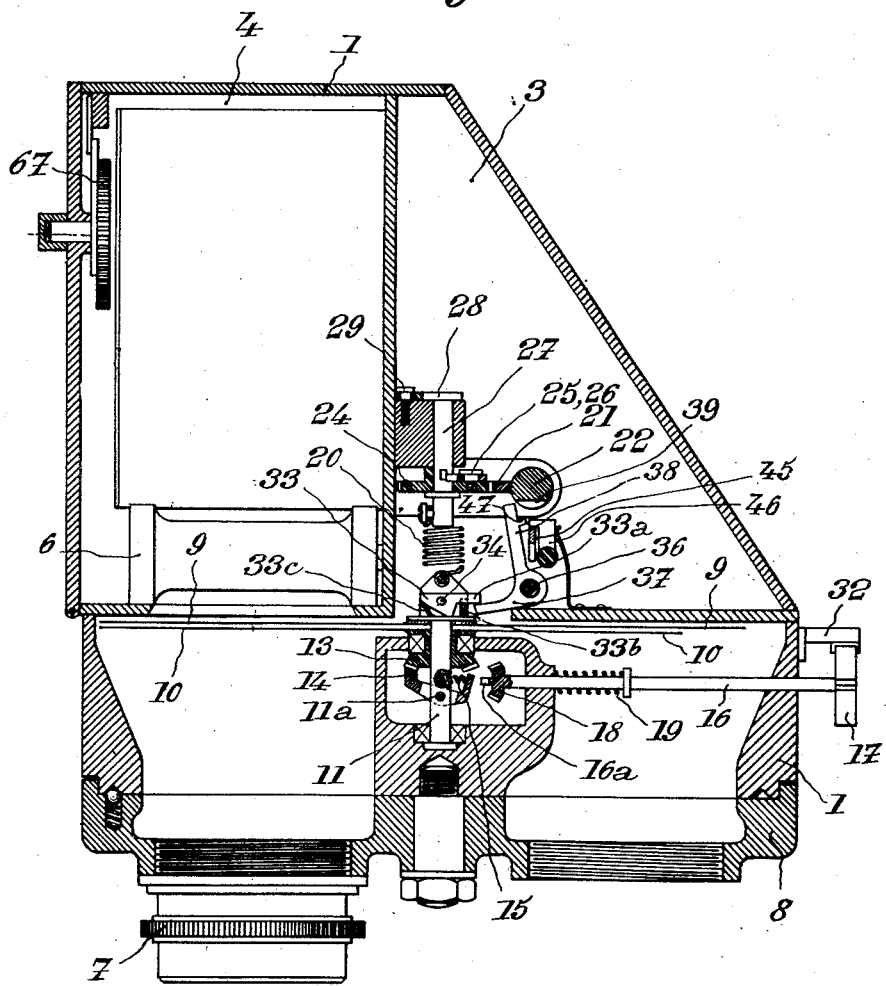
Fig. 2 is a transverse sectional view on the line II—II of Fig. 1.
Figure 9:
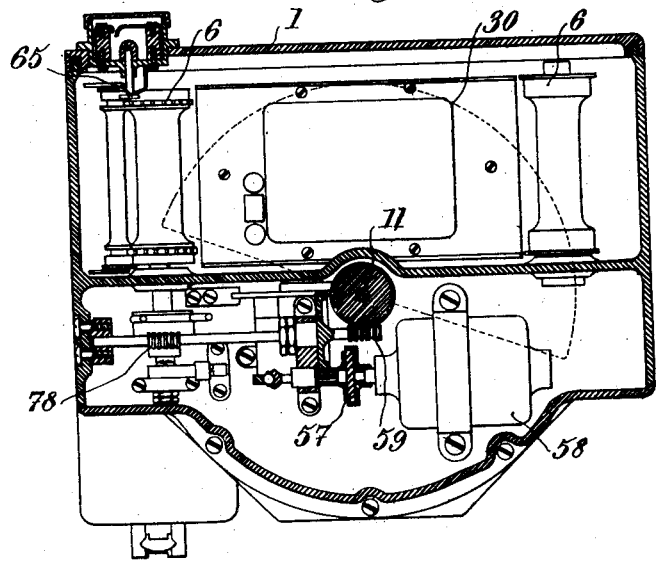
Fig. 9 is a horizontal sectional view on the line IX—IX of Fig. 5.

In order to lock rod 22 in this position at the end of its forward and return stroke, I make use for instance of a swinging member 40, one of the branches of which, constituted by a spring blade 41, comes, in the locking position of said swinging member, to act as a stop for a ring 42 carried by said rod 22. The whole is brought into said locking position during the setting operation through suitable means. For instance the other branch of the swinging member 40 is provided with an inclined edge 43 which cooperates with the ring 42 of rod 22 during the forward movement of said rod, so as to lower said swinging member and to engage its end 45 under a pawl 46, as illustrated by Fig. 2.

This locking position is maintained during the return stroke of rod 22. Ring 42 then moves past blade 41, which it deflects downwardly owing to its elasticity. After the movement has been completed, this blade opposes any return movement of rod 22 as long as the swinging member 40 has not been disengaged, at 45, from pawl 46. This disengagement is performed as a result of the operation of the release member the lever 38 of which pushes pawl 46 through a finger 47, the swinging member 40 coming back into its non-locking position (Fig. 1) under the effect of a spring 48.

Therefore, I finally obtain the desired interlockings; in other words it is impossible, on the one hand, to move the film forward before the shutter has been released, and, on the other hand, to release the shutter before the new portion of the film has been brought into the field of the lens, and, finally, to release the shutter twice in succession (because it would be necessary to reset the shutter).

The system above described is advantageously completed by means capable of braking the spindle 11 of the blades at the end of its revolution. In the embodiment shown by the drawings, these means consist of a braking finger 51 which, coming into contact with piece or pawl 33 at the end of said revolution, absorbs the shock while allowing said piece to move past it, and prevents said piece 33 from rebounding.

Finally, I obtain an apparatus the operation of which results clearly from the preceding description and which has, over existing apparatus of the same kind, many advantages among which the following can be pointed out especially:

The apparatus according to the invention ensures a perfect safety of operation and wholly eliminates the possibility of errors;

It is strong and cannot get out of order, owing to the provision of a perfectly rigid shutter;

It is well adapted to be used in connection with multiple lens, while calling for only one shutter;

And it permits of varying the times of exposure in a very simple manner. But it should be well understood that it is also possible to act upon the speed of the rotary screen, for instance by more or less winding up the spring 20 or by subjecting the release to the control of a variable action braking device.

In Figs. 5 to 9, I have shown an apparatus which, instead of being operated manually as that of Figs. 1 to 4, is worked automatically, which can be obtained either through electric current impulses or pneumatically, or through any other means.

In the case in which use is made of current impulses, I provide, for instance, in place of the manual control of Figs. 1 to 4, a lever 54 operable by an electro-magnet 55—56. The chief function of this lever is to control the working of a clutch 57 interposed between, on the one hand, an electric or other motor 58, supposed to turn in a continuous manner, and, on the other hand, kinematic parts adapted to permit of effecting, from said motor, the operations above mentioned, that is to say: the winding up of spring 20, the movement of the film, and the release of the shutter; said kinematic elements including for instance speed reducing gears such as endless screws 59, 78.

Lever 54 will be capable, for instance, of occupying two positions, controlled by two coils 55, 56, of the electro-magnet, and stabilized by any tripping mechanism adapted to occupy two different positions, corresponding respectively to the clutch being let in and the clutch being disengaged.

The electro-magnet 55 which corresponds to the clutch being let in will be actuated by impulses emitted at an adjustable rate by an emitting system with contacts 60, said rate depending upon the height and the speed of the aircraft, in such manner that the successive pictures, account being taken of the field of the lens, are juxtaposed, or partially overlap one another (for instance by 30%). The adjustment will be effected for instance by means of gradual change speed device 61, interposed between the contacting system 60 and a motor 62.

The electro-magnet 56 which is intended to bring back lever 54 into the position thereof corresponding to the disengagement of the clutch (a movement which may simultaneously produce the release of the shutter, through suitable connections) will be actuated by impulses emitted from a contacting device 63 driven by one of the parts which are actuated through the clutch, the whole being devised in any case in such manner that release takes place at the desired time after a new portion of the film has been fed into correct position.

Figure 10:
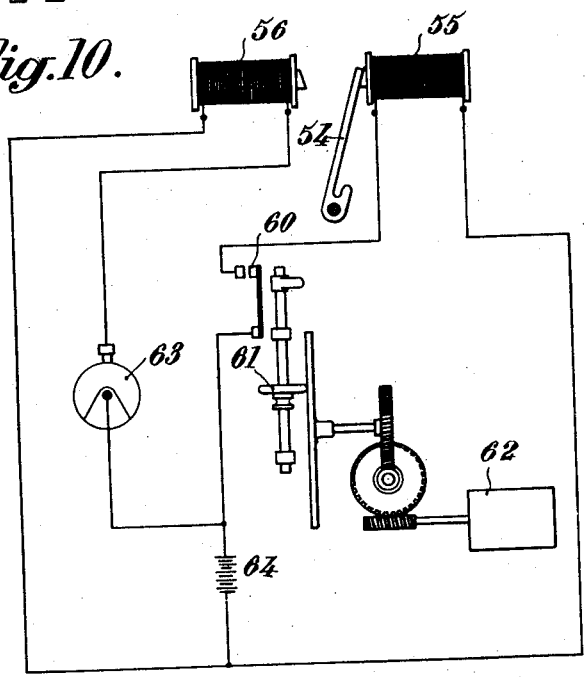
Fig. 10 is a diagram illustrating the operation of the apparatus shown by Figs. 5 to 9.

These two electro-magnets will be, for instance, connected in shunt to a battery 64 (Fig. 10).

Finally, a device 63 (Fig. 9) may be provided for cutting off the current of motor 62 when the whole of the film has been unwound from its spool or its magazine, said device including a circuit-breaker or relay which is brought into play when there is no longer any film on said spool.

I may, further, have recourse to some supplementary arrangements, such as those hereinafter described, which may eventually, be employed separately:

According to one of these arrangements, I combine with the lid 1' of the case or chamber 4 in which the magazines 5 and 5' are mounted, which contain the spools for the winding or unwinding of the film, means capable, when said lid is closed, of opening said magazines, whereas they are closed as soon as said lid is opened.

For this purpose, for instance, as shown by Figs. 1 to 4, a handle 66, carrying the catch or any other lid closing means 67, is adapted to drive a toothed pinion 68 which itself meshes with toothed sectors 69, 70, which, in the closing position of said lid, are adapted to drive, through lugs 71, 72 and 73, 74, the two magazines, in such manner as to produce their opening or their closing, according to the direction in which handle 66 is actuated.

The whole of the apparatus may be further completed by the provision, in its casing, of various measurement instruments, such as level, compass, etc., the indications of which instruments might eventually be photographed on the film, by means of a special lens 75 and a light source 76 (Fig. 8).

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. In a photographic apparatus having a casing, at least one lens mounted on said casing, and means inside said casing for holding a light sensitive surface element in the field of said lens, a flat shutter structure rotatable about an axis at right angles to its own plane mounted in said casing close to said means, a spindle rotatable in said casing about said axis, said shutter structure including a first sector-shaped blade having its apex on said axis and rigidly fixed to said spindle, a second sector-shaped blade spaced apart angularly from the first one so as to leave an angular slot between them rotatable about said spindle, a pinion rigid with said second blade, a comb-like part mounted on said spindle and movable into and out of mesh with said pinion, resilient means for urging said comb-like part into mesh with said pinion, whereby said second mentioned blade is angularly coupled with said spindle, a rod extending to the outside of said casing, an operating knob for said rod on the outside of said casing, the inner end of said rod being adapted to engage said comb-like member and to force it away from said pinion when said rod is pushed inwardly, a pinion keyed to said rod in such position as to come into mesh with the first mentioned pinion when said rod is thus pushed inwardly, whereby the second mentioned blade is then uncoupled from said spindle and can be caused to rotate with respect thereto by means of said rod, and a release mechanism for temporarily rotating said spindle about its axis, so as to permit a beam of light from said lens to sweep over the light sensitive surface element held by said first mentioned means.

2. In a photographic apparatus having a casing, at least one lens mounted on said casing, and means inside said casing for holding a light sensitive surface element in the field of said lens, a flat shutter structure rotatable about an axis at right angles to its own plane mounted in said casing close to said means, a spindle rotatable in said casing about said axis, said shutter structure including a first sector-shaped blade having its apex on said axis and rigidly fixed to said spindle, a second sector-shaped blade, spaced apart from the first one angularly so as to leave an angular slot between them, rotatable about said spindle, a pinion rigid with said second blade, a comb-like part mounted on said spindle and movable into and out of mesh with said pinion, resilient means for urging said comb-like part into mesh with said pinion, whereby said second mentioned blade is angularly coupled with said spindle, a rod extending to the outside of said casing, an operating knob for said rod fixed to the part thereof located on the outside of said casing, the inner end of said rod being adapted to engage said comb-like member and to force it away from said pinion when said rod is pushed inwardly, a pinion keyed to said rod in such position as to come into mesh with the first mentioned pinion when said rod is pushed inwardly, whereby said second mentioned blade is then uncoupled from said spindle and can be caused to rotate with respect thereto by means of said rod, means for angularly locking said rod and said knob when said rod is in the outward position, said rod being free to rotate when it is pushed in the inward position, and a release mechanism for temporarily rotating said spindle about its axis, so as to permit a beam of light from said lens to sweep over the light sensitive surface element held by said first mentioned means.

3. In a photographic apparatus having a casing, at least one lens mounted on said casing, and means inside said casing for holding a light sensitive surface element in the field of said lens, a flat shutter structure rotatable about an axis at right angles to its own plane mounted in said casing close to said means, a spindle rotatable in said casing about said axis, said shutter structure including a first sector-shaped blade having its apex on said axis and rigidly fixed to said spindle, a second sector-shaped blade, angularly spaced apart from said first mentioned blade so as to leave an angular slot between them, rotatable about said spindle, gear means, including an endless screw, for normally angularly coupling said second mentioned blade with said spindle, a rod extending to the outside of said casing and slidable with respect thereto in the direction of its axis, a knob carried by said rod on the outside of said casing so as to permit of turning said rod about its axis, and cooperating clutch means carried by the inner end of said rod and said gear means, for simultaneously uncoupling said second mentioned blade and said spindle and transmitting to said second mentioned blade the rotation of said rod about its axis, and a release mechanism for temporarily rotating said spindle about its axis, so as to permit a beam of light from said lens to sweep over the light sensitive surface element held by the first mentioned means, 4. A photographic apparatus which comprises, in combination, a casing, at least one lens mounted on said casing, means inside said casing for holding a photographic film in the field of said lens, magazines for said film in said casing associated with said means, a flat shutter structure rotatable in its own plane mounted in said casing close to said holding means, said shutter structure being provided with a slot, means for rotating said shutter structure inside said casing so as to cause a beam of light from said lens to sweep over the surface of said film holding means, a lid for said casing, means for locking said lid, and means, interconnected with said locking means, for opening said magazines when said lid is closed and closing said magazines when said lid is opened.

5. A shutter construction for photographic cameras or the like comprising, a pair of shutter elements disposed adjacent one another and mounted for rotation about a common axis, each of said shutter elements having a sector opening, means for rotating the elements, means for controlling the relative position of the elements to control the size of the common opening formed by the sector openings in each, means for actuating said control means, a detachable coupling between said control means and said actuating means, means for locking the shutter elements in any desired relative position so that they will rotate together in such position, said locking means being releasable through said actuating means.

6. A shutter construction for photographic cameras or the like comprising, a pair of shutter elements disposed adjacent one another and mounted for rotation about a common axis, each of said shutter elements having a sector opening, means for rotating the elements, means for controlling the relative position of the elements to control the size of the common opening formed by the sector openings in each, means for actuating said control means, a detachable coupling between said control means and said actuating means, means for locking the shutter elements in any desired relative position so that they will rotate together in such position, said locking means being releasable through said actuating means, said actuating means comprising a rod mounted for rotation and for longitudinal sliding movement, and means secured to said rod for engaging said control means when the rod is moved longitudinally in one direction, said longitudinal movement of said rod also effecting the release of said locking means.

7. A shutter construction as defined in claim 5 in which the means for controlling the relative position of the shutter elements includes a worm gear engaging a gear on a common pin which forms the axis of rotation of the shutter elements.

8. A shutter construction as defined in claim 5 in which the means for rotating the shutter elements is comprised of a pin disposed at the axis of rotation, a spring secured at one end to said pin and adapted when under tension to rotate said pin, one of said shutter elements being rigidly secured to said pin and the other shutter element being detachably keyed to said pin.

9. In a shutter construction as defined in claim 5, an indicating device for indicating the time of exposure, said means for actuating the control means including a rod, a gear wheel on said rod, and a rack adapted to be moved longitudinally by said gear wheel to actuate said indicating device.

10. A shutter construction for photographic cameras and the like comprising, a pair of shutter elements disposed adjacent one another and mounted for rotation about a common axis, said shutter elements being adapted to have a film advanced past them, each of said shutter elements having a sector opening, means for rotating the elements, means for controlling the relative position of the elements to control the size of the common opening formed by the sector openings in each, means for actuating said control means, a detachable coupling between said control means and said actuating means, means for locking the shutter elements in any desired relative position so that they will rotate together in such position, said locking means being releasable through said actuating means, and control means for preventing rotation of the shutter elements until the film has been advanced and for preventing repeated advance of the film until the shutter elements have been rotated.

11. A shutter construction for photographic cameras or the like comprising, a pair of shutter elements disposed adjacent one another and mounted for rotation about a common axis, each of said shutter elements having a sector opening, means for rotating the elements, means for controlling the relative position of the elements to control the size of the common opening formed by the sector openings in each, means for actuating said control means, a detachable coupling between said control means and said actuating means, means for locking the shutter elements in any desired relative position so that they will rotate together in such position, said locking means being releasable through said actuating means, said controlling means and said locking means being mounted on said common axis.

ISAAC KITROSER.